United States Patent
Wang et al.

(10) Patent No.: US 8,674,658 B2
(45) Date of Patent: Mar. 18, 2014

(54) SYSTEM AND METHOD FOR CHARGING PLURAL INFORMATION HANDLING SYSTEM BATTERIES

(75) Inventors: Ligong Wang, Round Rock, TX (US); John Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 1785 days.

(21) Appl. No.: 11/852,349

(22) Filed: Sep. 10, 2007

(65) Prior Publication Data
US 2009/0066296 A1    Mar. 12, 2009

(51) Int. Cl.
H02J 7/00    (2006.01)

(52) U.S. Cl.
USPC .............. 320/117; 320/121; 320/160

(58) Field of Classification Search
USPC ......................... 320/117, 121, 160
See application file for complete search history.

(56) References Cited

U.S. PATENT DOCUMENTS

| | | | | |
|---|---|---|---|---|
| 5,637,981 A * | 6/1997 | Nagai et al. | .................... | 320/160 |
| 5,644,212 A * | 7/1997 | Takahashi | .................... | 320/134 |
| 5,729,117 A * | 3/1998 | Fukuda | .................... | 320/117 |
| 5,731,686 A * | 3/1998 | Malhi | .................... | 320/154 |
| 5,801,514 A * | 9/1998 | Saeki et al. | .................... | 320/136 |
| 5,929,602 A * | 7/1999 | Suzuki | .................... | 320/116 |
| 5,955,867 A * | 9/1999 | Cummings et al. | ............ | 320/107 |
| 6,074,775 A | 6/2000 | Gartstein et al. | ................ | 429/53 |
| 6,118,248 A | 9/2000 | Gartstein et al. | ............. | 320/107 |
| 6,160,377 A | 12/2000 | Fujii | .................... | 320/117 |
| 6,163,131 A | 12/2000 | Gartstein et al. | ............. | 320/118 |
| 6,462,511 B1 | 10/2002 | Kwok | .................... | 320/119 |
| 6,768,286 B2 * | 7/2004 | Trembley | .................... | 320/117 |
| 6,835,491 B2 | 12/2004 | Gartstein et al. | ................ | 429/92 |
| 2006/0155183 A1 * | 7/2006 | Kroecker et al. | ............. | 600/391 |
| 2007/0247107 A1 * | 10/2007 | Wang et al. | .................... | 320/107 |

* cited by examiner

Primary Examiner — M'Baye Diao
(74) Attorney, Agent, or Firm — Terrile, Cannatti, Chambers & Holland, LLP; Robert W. Holland

(57) ABSTRACT

Plural batteries installed in an information handling system are simultaneously charged in a constant current mode to a predetermined charge and then in a constant voltage mode to a full charge to provide a reduced charge time and improved battery life. A current regulator integrated in a battery casing monitors current applied at the battery to maintain constant voltage charging. Voltage to ground of the other batteries is monitored to adjust current at those batteries where voltages in all of the battery cells are maintained substantially equal during charging.

14 Claims, 5 Drawing Sheets

SYSTEM AND METHOD FOR CHARGING PLURAL INFORMATION HANDLING SYSTEM BATTERIES

BACKGROUND OF THE INVENTION

1. Field of the Invention

The present invention relates in general to the field of information handling system batteries, and more particularly to a system and method for charging plural information handling system batteries.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have grown increasingly popular with end users as such systems have become more powerful. Portable information handling systems integrate a display and an internal power source within in a portable housing so that the system operates independent of hard wire connections, such as for interfacing with external peripherals or power. Typically, portable information handling systems are equipped with an integrated lithium ion battery that holds a charge to power system components when the system is not coupled to an external power source. When the system is couple to an external power source, power in excess of that needed to run the system is used to charge the battery. A typical information handling system battery will hold enough charge to support system operation for three to four hours and will continue to hold a reasonable charge for more than a year of usage before needing replacement. In some portable information handling systems, the amount of available charge is effectively increased by using plural batteries. A switch in the information handling system power system selects a battery for use, whether charging or discharging, and changes between batteries based on the available charge.

One disadvantage to portable information handling systems is that, after a battery discharges, the system must typically interface with an external power source for an extended period of time to recharge the battery. In order to reduce charge time, information handling systems sometimes use charging techniques that vary based upon the amount of charge present in the battery. For example, one technique reduces charge time by applying a constant current for about an hour until approximately an 80% RSOC (Relative Status of Charge) and then using pulse charging to fully charge the battery, usually over a time period of about another hour. Thus, in dual battery systems, charging time for both batteries is often four hours. Although pulse charging provides reduced charging times, it also tends to have a negative impact on long term battery life due to the chemical reaction within the lithium ion battery cells. Information handling system batteries are often expensive to replace, so reduced battery life expectancy provides a negative end user experience, particularly since the charge life of a battery tends to shorten as the battery life expectancy is approached.

SUMMARY OF THE INVENTION

Therefore a need has arisen for a system and method which provides rapid charging of information handling system batteries with reduced impact on battery life expectancy.

In accordance with the present invention, a system and method are provided which substantially reduce the disadvantages and problems associated with previous methods and systems for charging information handling system batteries. Plural batteries are simultaneously charged by an information handling system to obtain a reduced overall charging time. A constant current charge mode provides a predetermined charge level followed by a constant voltage charge mode to a full charge, with the constant voltage charge mode supported by current regulating circuitry at one or more of the batteries.

More specifically, an information handling system has plural processing components that cooperate to process information. The processing components are powered by external power or by internal power, such as plural batteries inserted into plural battery cavities formed in the housing of the information handling system. When external power is applied, excess power is provided to a charger within the information handling system that charges the batteries. To reduce battery charge time, the charger simultaneously charges the batteries with a constant current mode to a predetermined charge level, such as approximately 80%, and then simultaneously charges the batteries with a constant voltage mode to a full charge. The constant voltage mode is maintained by current regulating circuitry, such as a current regulator integrated in the casing of one or more of the batteries. Constant voltage is maintained at batteries that lack the current regulator by managing the voltage to ground with the battery management unit where the voltage level of the battery cells is maintained at a substantially equal level by the information handling system power manager.

The present invention provides a number of important technical advantages. One example of an important technical advantage is that information handling system batteries reach a full charge in reduced charging time. For example, in one embodiment, charge time for two batteries is reduced from four hours to three. Similar improvements in charge time are provided with systems having more than two batteries. The constant current and constant voltage charging modes improve battery lifetime relative to other modes for achieving a rapid charge. Interfacing plural batteries simultaneously to an information handling system charger provides constant current and constant voltage charging to the batteries as a unit to reduce the expense associated with a switch and logic to select a battery for charging.

BRIEF DESCRIPTION OF THE DRAWINGS

The present invention may be better understood, and its numerous objects, features and advantages made apparent to those skilled in the art by referencing the accompanying

DETAILED DESCRIPTION

Simultaneous charging of plural batteries by an information handling system using constant current followed by constant voltage modes provides reduced battery charge times and increased battery life. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
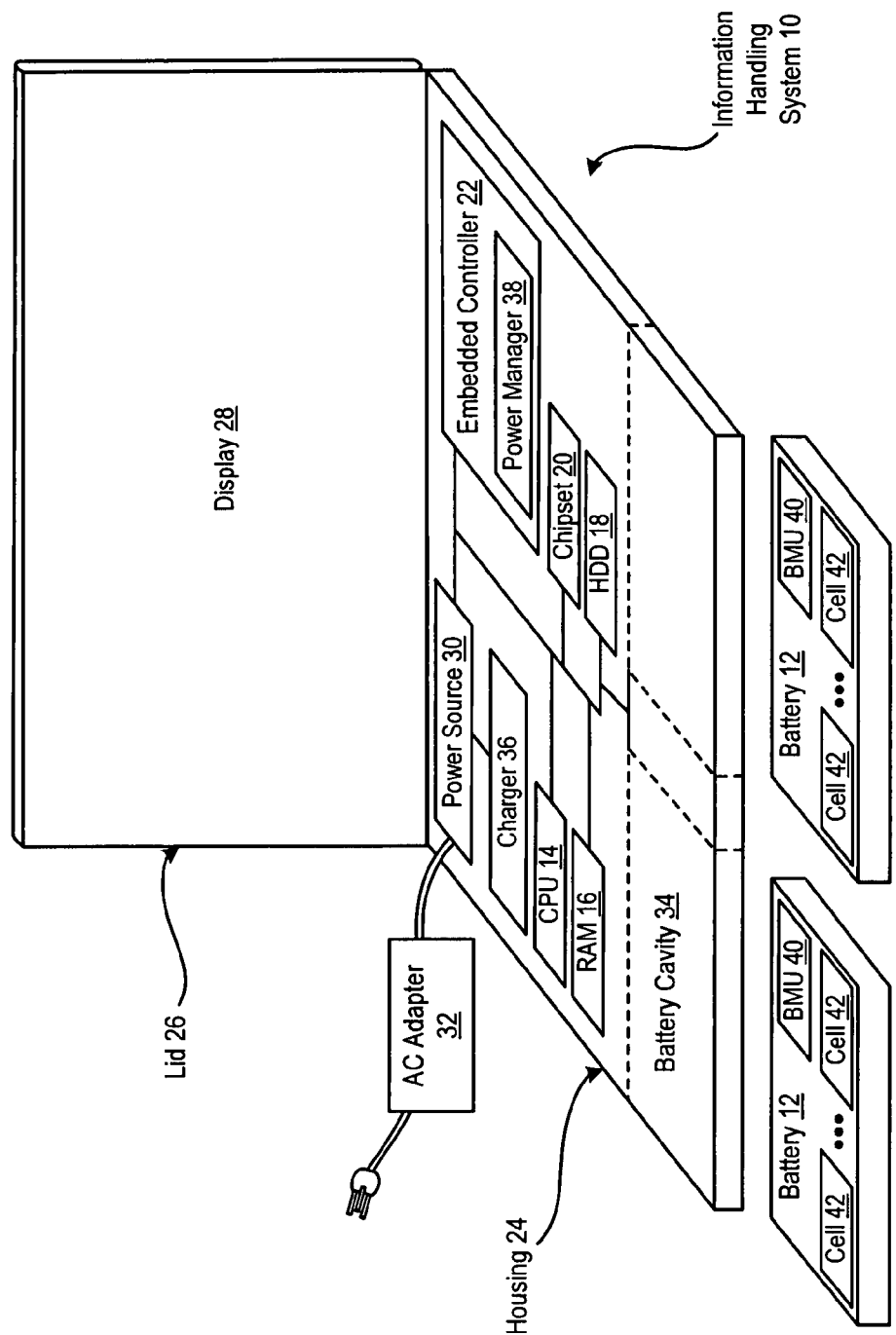
FIG. 1 depicts a block diagram of an information handling system having simultaneous charging of dual batteries.

Referring now to FIG. 1, a block diagram depicts an information handling system 10 having simultaneous charging of dual batteries 12. Information handling system 10 is built from plural processing components that cooperate to process information, such as a CPU 14, RAM 16, a hard disk drive 18, a chipset 20 and an embedded controller 22. The processing components are disposed in a portable housing 24 having a rotationally coupled lid 26 that supports an integrated display 28 for presenting information as visual images. A power source 30 accepts external power from an AC adapter and applies the power to the processing components. When external power is not available, batteries 12 insert into battery cavities 34 formed in housing 24 to provide power to run the processing components. A charger 36 under the control of a power manager 38 directs extra external power to charge batteries 12 when external power is available. Batteries 12 are smart batteries having an internal battery management unit (BMU) 40 and plural cells 42 integrated in a casing 44. BMU 40 tracks the charge state of cells 42 and communicates the charge state to power manager 38.

Figure 2:
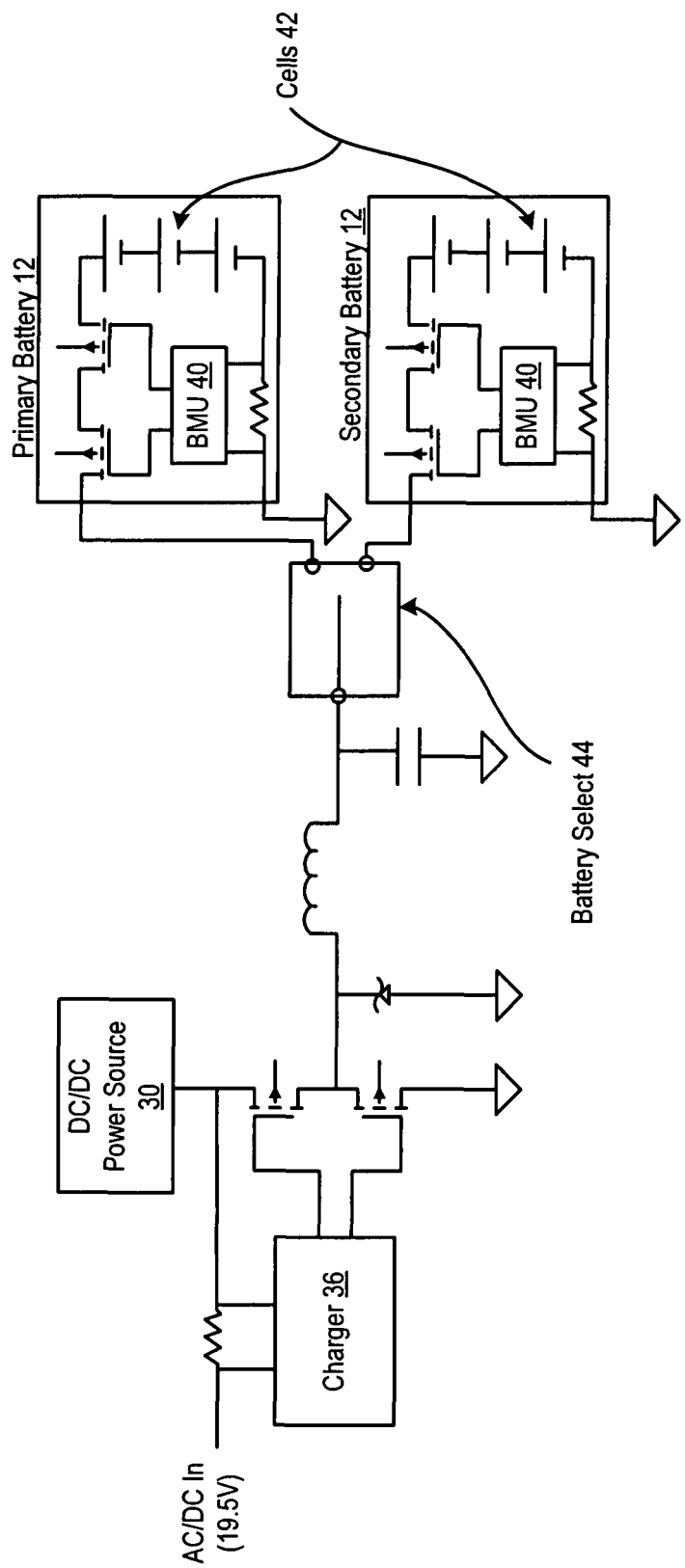
FIG. 2 depicts a circuit diagram of a battery power circuit operable to selectively interface a first or a second battery.
Figure 3:
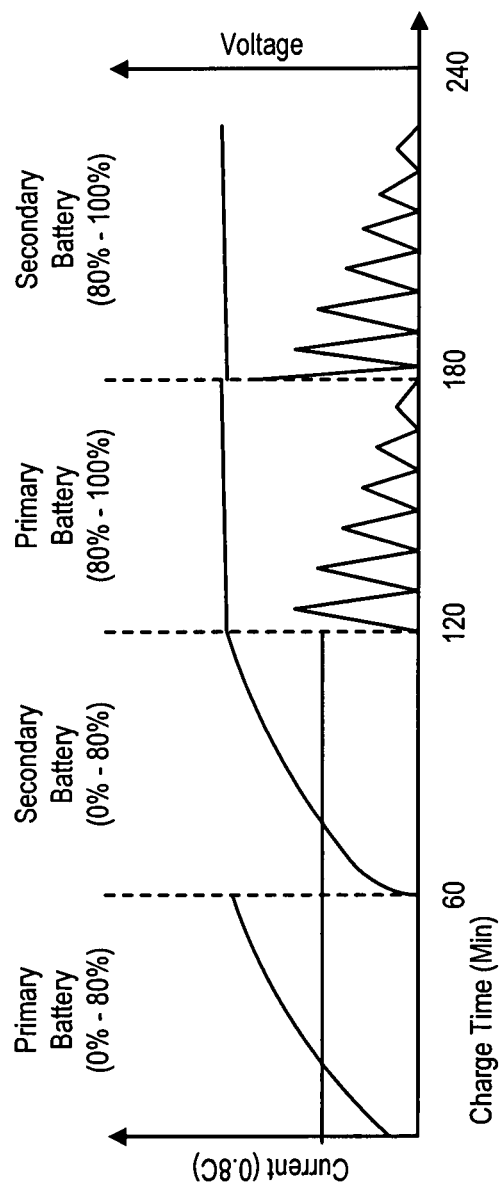
FIG. 3 depicts charging over time of dual batteries individually using pulse charging.

Referring now to FIG. 2, a circuit diagram depicts a battery power circuit operable to selectively interface a first or a second battery 12. A battery selector 44 selectively interfaces a first or second battery 12 with power source 30 and charger 36 so that the interfaced battery 12 can discharge or charge based on the availability of external power. As an example, FIG. 3 depicts charging over time of dual batteries 12 individually using pulse charging. The primary battery 12 is selected with battery selector 44 and charged with a constant current to achieve a predetermined charge level, such as 80%. The secondary battery 12 is then selected with battery selector 44 and charged with a constant current to the predetermined charge level. In the example depicted, each battery 12 charges in the constant current mode for approximately one hour to reach the predetermined charge level. After the predetermined charge level is achieved, the primary battery 12 is selected with battery selector 44 and charged with a constant voltage using pulses of current to provide a more rapid full charge. After the primary battery receives a full charge, the secondary battery 12 is charged with a constant voltage using pulse charges. In the example depicted by FIG. 3, pulse charging to a full charge with each battery 12 takes an hour for each battery so that the time needed to complete charging of both batteries individually to a full charge is approximately four hours.

Figure 4:
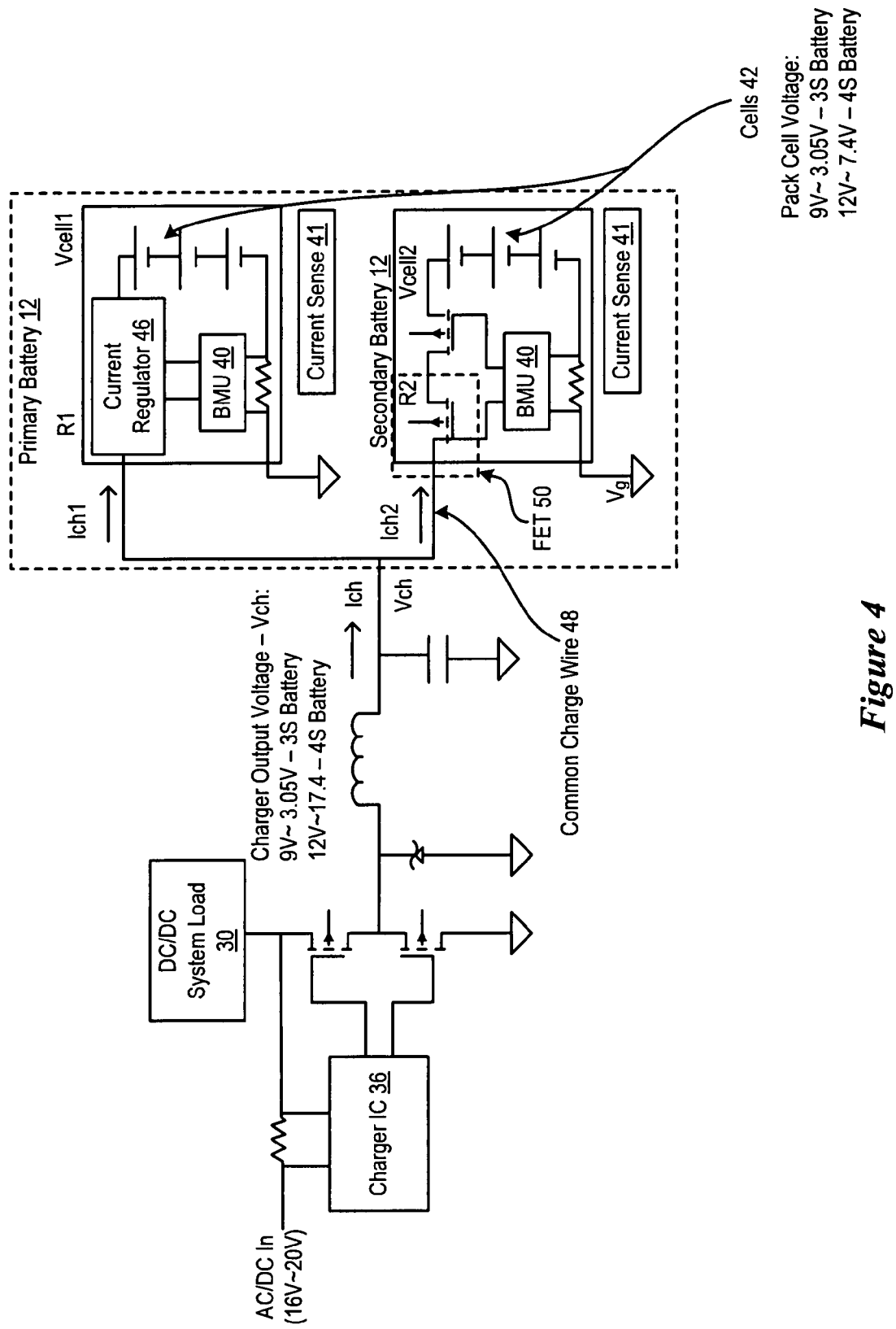
FIG. 4 depicts a circuit diagram of a battery charging circuit operable to simultaneously charge dual batteries with constant current or constant voltage modes.
Figure 5:
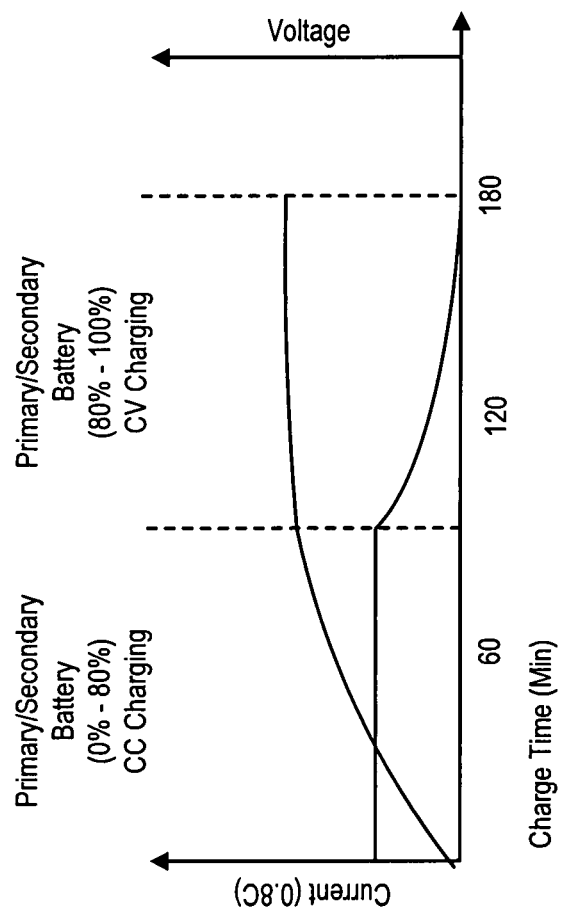
FIG. 5 depicts charging over time of dual batteries simultaneously using constant current and constant voltage modes.

Referring now to FIG. 4, a circuit diagram depicts a battery charging circuit operable to simultaneously charge dual batteries 12 with constant current or constant voltage modes. Instead of selecting a battery 12 to individually interface with charger 36, a common wire 48 interfaces both batteries 12 with charger 36 simultaneously. As depicted by the graph of FIG. 5, charger 36 first applies constant current charging mode to bring both batteries simultaneously to a predetermined charge state, such as 80% charged. After both batteries reach the predetermined charge state, charger 36 then applies a constant voltage charging mode to bring both batteries 12 simultaneously to a fully charged state. In order to maintain a substantially constant voltage in the constant voltage charge mode, a current regulator 46 integrated in the casing of primary battery 12 regulates the current applied to battery cells 42. As depicted by FIG. 5, simultaneous charging reduces total charge time in the example embodiment from four hours to three hours without using a pulse charging mode, thus increasing overall battery life.

Current regulating circuitry 46 integrated in the casing of a battery 12 supports constant current and constant voltage charging modes without pulse charging. In order to regulate current in secondary battery 12, a current regulator might also be included, or current may be regulated with existing battery components. For example, secondary battery 12 uses a field emission transistor (FET) 50 to prevent excessive current. Regulating the voltage at ground Vg with BMU 40 allows adjustment of charging current as long as the voltage levels of battery cells 42 are substantially equal between the primary and secondary batteries 12. The voltage levels of the battery cells are maintained at substantially equal levels by the power manager 38 using normal power management techniques. For example, with proper discharge, voltage Vcell1 is equal to or close in value to voltage Vcell2 when charging starts. Power manager 38 monitors the battery charging process to establish the type of charging mode and the charging conditions at each battery 12 during the charging process. For example, charging current is determined by charge path resistance, which is monitored through current sense 41 and adjusted by BMU 40 in order to meet charge requirements. When charge current Ich and charge voltage is managed by charger 36, a constant current or constant voltage may be supported without current regulator 46. Charge current from charger 36 is applied with Ich=Ich1+Ich2; Vcell1=Vch−Ich1*R1; and Vcell2=Vch−Ich2*R2. FET gate voltage is adjusted to change the source-drain resistance in order to linearly control charge current. In alternative embodiments, variations of the current regulation presented in FIG. 4 support simultaneous charging of three or more batteries by an information handling system.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having first and second battery cavities, each battery cavity sized to accept a battery;
   plural processing components disposed in the housing and operable to process information;
   first and second batteries inserted in the first and second cavities and operable to provide power to the processing components;
   a charger system operable to provide a charge simultaneously to the first and second batteries, the charge having a substantially constant current to a predetermined charge level and a substantially constant voltage from the predetermined charge level to a full charge level.

2. The information handling system of claim 1 wherein the charger system comprises a charger operable to output the charge and a current regulator interfaced with the charger and operable to maintain the charge at the constant voltage.

3. The information handling system of claim 2 wherein the charger is integrated in the housing and the current regulator is integrated in the first battery.

4. The information handling system of claim 3 wherein the second battery comprises a management unit operable to maintain a predetermined voltage to ground to regulate current in cooperation with the current regulator.

5. The information handling system of claim 1 wherein the predetermined charge level comprises approximately 80% charged.

6. The information handling system of claim 1 further comprising a third battery inserted in a third cavity and operable to provide power to the processing components, wherein the charger system is further operable to simultaneously charge the first, the second, and the third batteries.

7. A method for charging plural information handling system batteries, the method comprising:
   interfacing an information handling system charger with the plural batteries;
   simultaneously charging the plural batteries with a constant current charging mode to a predetermined charge; and
   simultaneously charging the plural batteries with a constant voltage charging mode.

8. The method of claim 7 wherein interfacing an information handling system charger with the plural batteries further comprises:
   inserting a first battery into a first housing cavity of the information handling system;
   inserting a second battery into a second housing cavity of the information handling system; and
   electrically coupling the first and second batteries to the charger with a shared wire.

9. The method of claim 7 wherein simultaneously charging the plural batteries with a constant voltage charging mode further comprises monitoring the current applied to at least one of the batteries with a current regulator.

10. The method of claim 9 wherein the current regulator is integrated in a casing of the battery.

11. The method of claim 9 wherein simultaneously charging the plural batteries with a constant voltage mode further comprises monitoring the voltage to ground of at least one battery.

12. The method of claim 11 wherein monitoring the voltage to ground of at least one battery further comprises adjusting battery cell voltages to remain substantially equal.

13. The method of claim 9 wherein the plural batteries comprise at least three batteries.

14. The method of claim 9 wherein the predetermined charge comprises approximately 80%.

* * * * *